(12) United States Patent
Yamaguchi et al.

(10) Patent No.: US 7,186,310 B2
(45) Date of Patent: Mar. 6, 2007

(54) METHOD FOR FORMING A HONEYCOMB SANDWICH COMPOSITE PANEL

(75) Inventors: Eikatsu Yamaguchi, Tokyo-To (JP); Seiji Maruyama, Tokyo-To (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 452 days.

(21) Appl. No.: 10/208,038

(22) Filed: Aug. 1, 2002

(65) Prior Publication Data

US 2003/0077410 A1   Apr. 24, 2003

(30) Foreign Application Priority Data

Aug. 3, 2001   (JP)   .............................. 2001-236673

(51) Int. Cl.
*B29C 47/00* (2006.01)

(52) U.S. Cl. .................... 156/245; 156/307.1; 428/117
(58) Field of Classification Search ................ 156/242, 156/245, 285, 286; 264/241, 259, 261, 271.1; 428/117
See application file for complete search history.

(56) References Cited

U.S. PATENT DOCUMENTS

| | | | |
|---|---|---|---|
| 4,323,623 A | 4/1982 | Ahrens et al. ............... 156/330 |
| 4,861,649 A | 8/1989 | Browne ....................... 428/240 |
| 4,968,545 A | 11/1990 | Fellman et al. ............. 428/286 |
| 5,431,995 A | 7/1995 | Narita et al. ................ 428/287 |
| 5,476,237 A | 12/1995 | Clarke .................... 239/265.19 |
| 5,567,499 A | 10/1996 | Cundiff et al. .............. 428/116 |
| 6,168,408 B1* | 1/2001 | Boime et al. ............. 425/129.1 |
| 6,679,969 B1* | 1/2004 | Fournier et al. ............ 156/245 |

FOREIGN PATENT DOCUMENTS

| | | | |
|---|---|---|---|
| DE | 10007373 | * | 11/2000 |
| EP | 0 588 437 | | 3/1994 |
| EP | 1005978 | * | 6/2000 |
| GB | 1498755 | | 1/1978 |
| GB | 1517910 | | 7/1978 |
| JP | 9-295362 | | 11/1997 |
| JP | 2000-167950 | | 6/2000 |
| WO | WO 97/25198 | | 7/1997 |

OTHER PUBLICATIONS

U.S. Appl. No. 09/453,055, filed Dec. 2, 1999 to Fuji Jukogyo Kabushiki Kaisha.
Lubin, George, "Handbook of Composites", Van Nostrand Reinhold Company, New York, 1982, pp. 755-778.

* cited by examiner

*Primary Examiner*—Justin R. Fischer
(74) *Attorney, Agent, or Firm*—Smith, Gambrell & Russell LLP

(57) ABSTRACT

A method for forming a honeycomb sandwich composite panel comprising dry fabrics, an unpermeating-resin film, a non-low-viscosity-resin film, a honeycomb core, a non-low-viscosity resin film, an unpermeating-resin film and dry fabrics, stacked in this order in a mold. The cells of the honeycomb core are sealed by the laminated films. The unpermeating-resin film prevents the excessive permeation of the resin which forms the laminated films into the dry fabrics and to enhance the adhesion of this resin to the honeycomb core by forming proper fillets of the resin of the laminated sealing films. Further, drying process for drying the dry fabrics enables the application of the RTM process to the formation of the honeycomb sandwich composite panel.

9 Claims, 3 Drawing Sheets

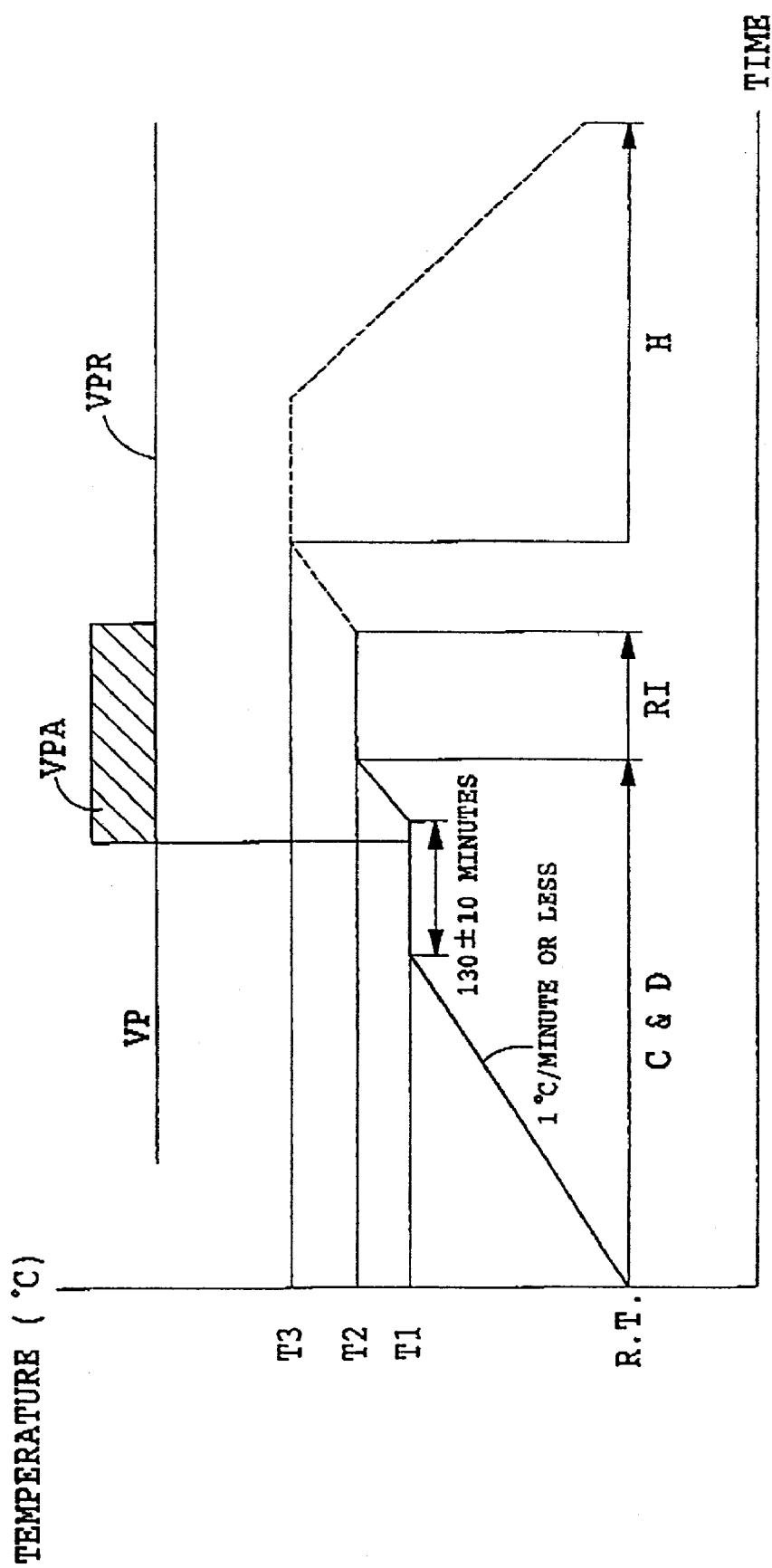
F I G. 3

METHOD FOR FORMING A HONEYCOMB SANDWICH COMPOSITE PANEL

BACKGROUND OF THE INVENTION

1. Field of the Invention

The present invention relates to a lightweight, high-stiffness honeycomb composite panel used in aircraft, automobiles, ships, buildings and general industrial equipment and, more particularly, to a method for forming the honeycomb sandwich composite panel using an RTM (resin transfer molding) process.

2. Description of the Related Art

In a previously known method for forming a honeycomb sandwich panel, outer panels formed as skins are placed on the top and bottom surfaces of a honeycomb core respectively and are bonded to the honeycomb core with an adhesive applied therebetween under heat and pressure. In another previously known method, prepreg sheets are stacked by hand lay-up operation on the top and bottom surfaces of a honeycomb core respectively, and are bonded to the honeycomb core with an adhesive applied therebetween in a vacuum space established in a vacuum bag enclosing the prepreg sheets and the honeycomb core using a hot press or an autoclave.

In addition, Japanese Patent Laid-Open No. 295362/1997 describes a method for forming a honeycomb sandwich panel using the RTM process, in which an impregnating resin is prevented from flowing into the cells of a honeycomb core with resin/moisture barrier films formed of a particular macromolecular film.

A method for forming a honeycomb sandwich composite panel disclosed in JP-A No. 5502968/2000 uses a polyimide film, such as Kapton® commercially available from E.I. du Pont de Nemours and Company, as a bonding barrier layer to prevent the resin impregnated into sheets (prepreg sheets) from flowing into the cells of a honeycomb core when a honeycomb sandwich composite panel is formed.

A method for forming a honeycomb sandwich composite panel disclosed in JP-A No. 167950/2000 comprises the steps of heating sealing materials and dry fabrics to be bonded to the surfaces of a honeycomb core at the thermo-setting temperature of the sealing materials, impregnating the dry fabric with a thermosetting resin, and hardening the thermosetting resin impregnated into the dry fabrics by pressing and heating those under predetermined conditions.

The known method for forming a honeycomb sandwich composite panel employing the RTM process needs to prevent the resin from flowing into the cells of the honeycomb core. Therefore, the cells of the honeycomb core need to be sealed before thermo-setting the honeycomb core in a mold. Thus, two steps and complicated work are necessary before starting an impregnating process, which is an impediment of cost reduction.

The method for forming a honeycomb sandwich composite panel disclosed in JP-A Nos. 2995362/1997 and 502968/2000 bond the skins and the honeycomb core together with a resin/moisture-resistant film of a specific polymer and a bonding barrier layer, respectively. Therefore, both the surfaces of the resin/moisture-resistant film and the bonding barrier layer must be coated with an adhesive, which increases the weight of the honeycomb sandwich composite panel. Generally, the specific polymer film is unsatisfactory in adhesive property and incapable of exerting high adhesive strength. Therefore, the film needs to be treated beforehand by a special pretreatment process, which increases processes and provides an impediment to cost reduction.

Although the method for forming the honeycomb sandwich composite panel disclosed in JP-A No. 167950/2000 is capable of solving the aforementioned problems, this method needs at least two thermo-setting adhesive films and epoxy resin films on the opposite sides of a carrier member, that is this method needs many sealing films.

SUMMARY OF THE INVENTION

The present invention has been made in view of the aforementioned problems, and it is therefore an object of the present invention to provide a method for forming a honeycomb sandwich composite panel capable of forming a reliable sealing layer consisting of a small number of component layers, and of preventing a resin from flowing into the cells of a honeycomb core during an impregnation process and of using a RTM process.

According to one aspect of the present invention, a method for forming a honeycomb sandwich composite panel includes the steps of: stacking dry fabrics, an unpermeating-resin film, a non-low-viscosity-resin film, a honeycomb core, a non-low-viscosity resin film, an unpermeating-resin film and dry fabrics in this order to form a stacked structure on a lower half mold of a mold; putting an upper half mold of the mold on the stacked structure; clamping together the upper and the lower half mold; closing resin supply ports and air ports formed in the upper and the lower half mold; heating an interior of the mold at a first temperature for a predetermined heating time to cure the unpermeating-resin films and the non-low-viscosity-resin films and to dry the dry fabrics; connecting the air ports of the upper and the lower half mold to an evacuating device; connecting the resin supply ports to a resin supply passage; closing the resin supply passage, and changing a temperature of the interior of the mold to a second temperature while the interior of the mold is evacuated; and supplying an impregnating resin into the mold to impregnate the dry fabrics with the impregnating resin and heating the interior of the mold at a third temperature for a predetermined heating time to cure the impregnating resin supplied into the mold.

Thus, the honeycomb sandwich composite panel forming method is capable of preventing the impregnating resin from flowing into the cells of the honeycomb core and of forming a honeycomb sandwich composite panel of a satisfactory quality at a low cost.

BRIEF DESCRIPTION OF THE DRAWINGS

The above and other objects, features and advantages of the present invention will become more apparent from the following description taken in connection with the accompanying drawings, in which:

FIG. 3 is a diagram showing the steps of a method for forming a honeycomb sandwich composite panel of the present invention.

DESCRIPTION OF THE PREFERRED EMBODIMENTS

Figure 1:
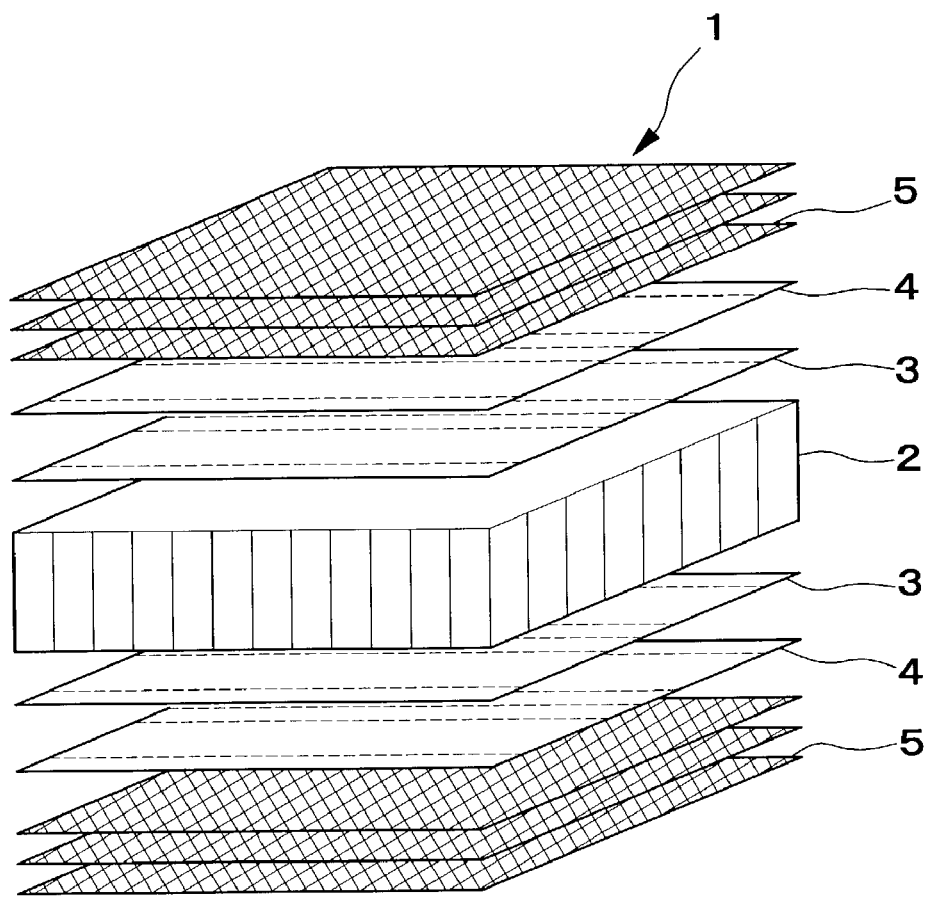
FIG. 1 is an exploded perspective view of a honeycomb sandwich composite panel formed by the method for forming a honeycomb sandwich composite panel of the present invention.
Figure 2:
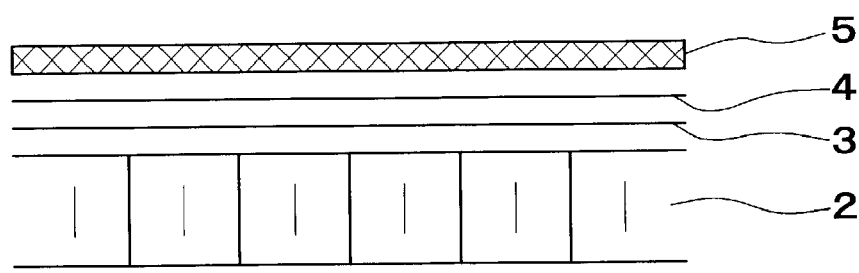
FIG. 2 is a fragmentary sectional view of a honeycomb sandwich composite panel formed by the method for forming a honeycomb sandwich composite panel of the present invention.

Referring now to FIG. 1, a honeycomb sandwich composite panel 1 formed by a method for forming a honeycomb sandwich composite panel in a first embodiment according to the present invention includes a honeycomb core 2, non-low-viscosity-resin films 3 extended on the opposite surfaces of the honeycomb core 2 respectively, unpermeating-resin films 4 extended on the outer surfaces of the non-low-viscosity-resin films 3 respectively, a plurality of dry fabrics 5 stacked on the outer surface of each of the non-low-viscosity-resin films 3. The non-low-viscosity-resin films 3 and the unpermeating-resin films 4 are constructing sealing members.

The non-low-viscosity-resin films 3 are such resin films that soften when it is heated up to the curing temperature, but do not melt and drip into the cells of the honeycomb core 2 before it is cured, and permit small parts thereof flow along the walls defining the cells of the honeycomb core 2 to form fillets. Resin films suitable for use as the non-low-viscosity-resin films 3 are selected on the basis of test results conducted on a honeycomb core include heating the resin film up to its curing temperature and evaluating the behavior of the resin film during heating up to the curing temperature. Examples of resin films suitable for use as the non-low-viscosity-resin films 3 are MB1515 curable at temperatures in the range of 145 to 180° C. and commercially available from CYTEC Fiberite Inc, FM123-5 curable at temperatures in the range of 115 to 155° C. and commercially available from CYTEC Industries and AF126 and AF126-2 commercially available from Minnesota Mining and Manufacturing Co.

The unpermeating-resin films 4 are such resin films that are cured without permeating into the dry fabrics 5 while the same are heated up to the curing temperature. The unpermeating-resin films 4 having such a property can be prepared by mixing a proper additive in a resin. A resin film suitable for use as the unpermeating-resin films 4 is formed, for example, by adding glass microballoons in a resin in a resin film forming process. A resin film AF325 commercially available from Minnesota Mining and Manufacturing Co. is an example of such a resin film. The inventors of the present invention found that resin films containing glass fibers or nonwoven glass fabrics instead of glass microballoons are suitable for use as the unpermeating-resin films 4. Thus, the non-low-viscosity-resin film 3 and the unpermeating-resin film 4 form a laminated sealing member capable of suppressing the permeation of the resin into the dry fabrics 5 and of surely forming a film and fillets when heated for curing.

The dry fabrics 5 are impregnated with a thermosetting epoxy resin or a thermosetting polycyanate resin. The honeycomb core 2 and the dry fabrics 5 are the same as those used for forming conventional honeycomb sandwich composite panels.

The method for forming a honeycomb sandwich composite panel embodying the present invention is now described with reference to FIGS. 3 and 4.

Figure 4:
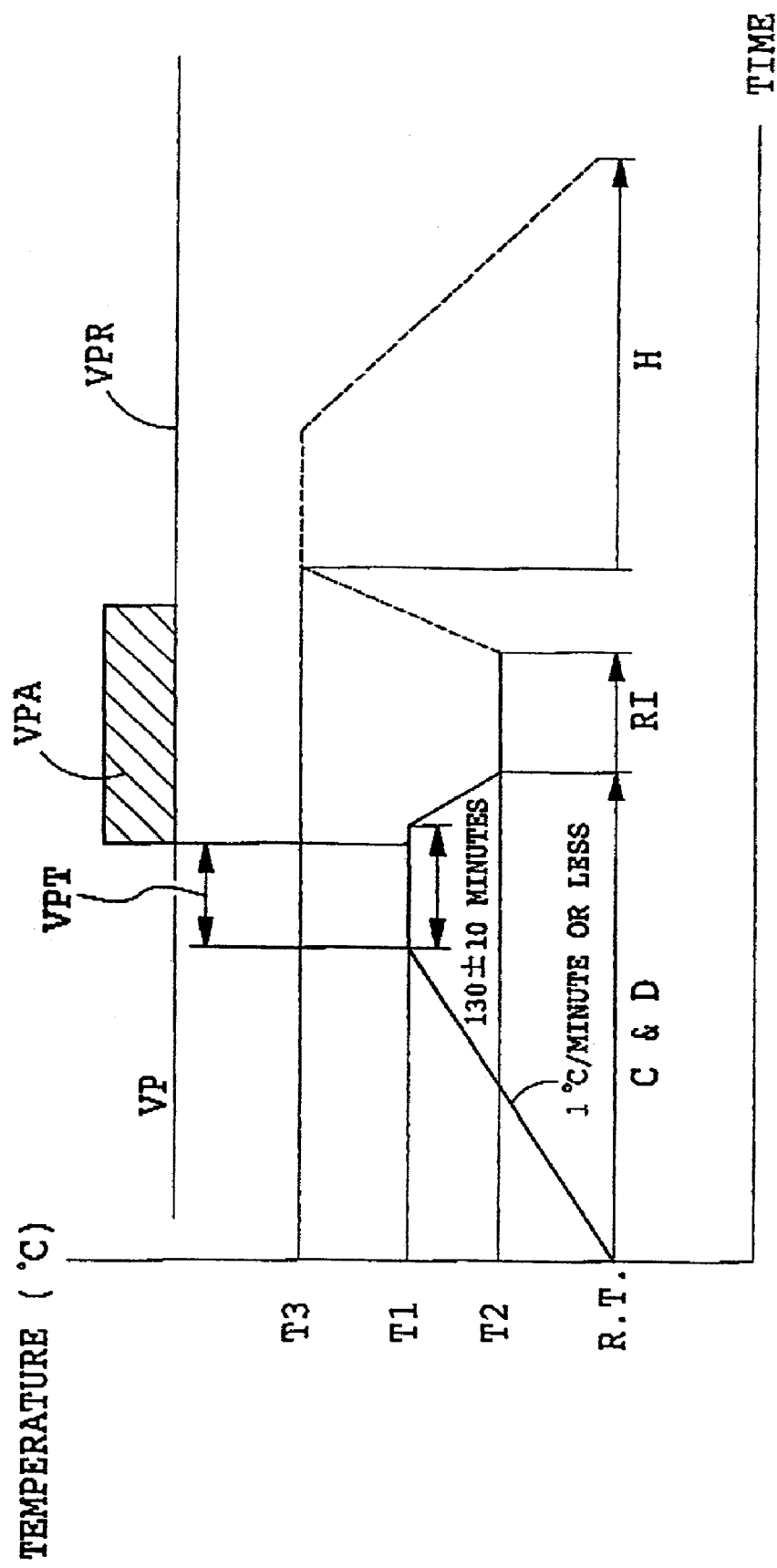
FIG. 4 is a diagram showing the steps of second embodiment of the method for forming a honeycomb sandwich composite panel of the present invention.

Referring to FIGS. 3 and 4, the dry fabrics 5 are stacked on a lower half mold of a mold (not shown), the unpermeating-resin film 4 is placed on the dry fabrics 5, the non-low-viscosity-resin film 3 is placed on the unpermeating-resin film 4, the honeycomb core 2 is placed on the non-low-viscosity-resin film 3, the non-low-viscosity resin film 3 is placed on the honeycomb core 2, the unpermeating-resin film 4 is placed on the non-low-viscosity-resin film 3, and the dry fabrics 5 are stacked on the non-low-viscosity resin film 4 to form a stacked structure on the lower half mold.

An upper half mold of the mold (nor shown) is put on the stacked structure and the upper half mold and the lower half mold are clamped together by a mold clamping mechanism. Then, air discharge ports and resin supply ports formed in the upper half mold and the lower half mold are closed by port-closing devices.

Then, the upper mold half and lower half mold and the stacked structure consisting of the component members are heated as shown in FIG. 3 or 4, to impregnate the dry fabrics 5 with an impregnating resin, and to cure the laminated sealing films.

First, the stacked structure is heated up to a first temperature (T1) for curing the laminated sealing films 3, 4 at a heating rate of 1° C./min or less, and the stacked structure is kept at the first temperature for a predetermined time, for example, 130±10 minutes, to cure the laminated sealing films 3, 4 and to dry the dry fabrics 5, as indicated by "C & D" in FIGS. 3 and 4.

Since the mold is sealed before starting the heating process, there is no pressure difference between a space on the inner side of the laminated sealing film, i.e., the interior of the cells, and a space accommodating the dry fabrics 5, and hence creation of defects, such as pores in the laminated sealing films 3, 4 can be avoided.

Since each laminated sealing member consists of thermosetting epoxy resin films each having different flowing profiles, namely, the unpermeating-resin film 4 contiguous with the dry fabric 5 and the non-low-viscosity-resin film 3 contiguous with the honeycomb core 2, the excessive permeation of the resin forming the unpermeating-resin film 4 into the dry fabrics 5 can be avoided and proper fillets capable of ensuring bonding strength can be formed. The dry fabrics 5 are dried and each of the non-low-viscosity-resin film 3 and the unpermeating-resin film 4 are cured to seal the cells of the honeycomb core 2 by the foregoing steps.

Subsequently, the port-closing devices are removed to open the air discharge ports and the resin supply ports of the upper and the lower half mold. Then, the opened air discharge ports are connected to a vacuum pressure device for evacuating the interior of the mold, such that vacuum pressure (as indicated by "VP"in FIGS. 3 and 4) is applied (as indicated by "VPA" in FIGS. 3 and 4) after 120 minutes or more (as indicated by "VPT" in FIG. 4) have elapsed after the temperature reached 150° C., after the stacked sealing member have been cured. The opened resin supply ports are connected to a resin supply line, and then the resin supply passage is closed.

Then, the interior of the mold is heated or cooled to a second temperature (T2) for impregnating the dry fabrics 5 with an impregnating resin, while the interior of the mold is being evacuated. After the interior temperature of the mold has coincided with the second temperature, the resin supply passage connected to the resin supply ports is opened to inject the impregnating resin into the mold at an injection pressure in the range of 0.2 to 0.3 MPa. Consequently, the dry fabrics 5 are impregnated with the impregnating resin as indicated by "RI" in FIGS. 3 and 4. After the impregnating resin starts to overflow through the air discharge port formed in the upper half mold, the air discharge port is closed so that the vacuum pressure may be released as indicated by "VPR" in FIGS. 3 and 4. The resin supply line is inspected for the leakage of the resin after the laminated sealing films have been cured to suppress the formation of bubbles in the laminated sealing films.

Then, the impregnating resin supplied into the mold is heated at a third temperature (T3) higher than the second temperature for a predetermined time to cure the impregnating resin as indicated by "H" in FIGS. 3 and 4. Thus, the honeycomb sandwich composite panel 1 is formed.

In the honeycomb sandwich composite panel forming method shown in FIG. 4, the second temperature is lower than the first temperature. The first and the second temperature are dependent on the curing temperature of the laminated sealing films and the temperature of the impregnating resin impregnated into the dry fabrics 5. A honeycomb sandwich composite panel having a necessary strength and a satisfactory quality can be formed by either the honeycomb sandwich composite panel forming method shown in FIG. 3 or the honeycomb sandwich composite panel forming method shown in FIG. 4. The first and the second temperature are selectively determined for further cost reduction and further improvement of quality.

Laminated sealing films, impregnating resins, and first, second and third temperatures for those laminated sealing films and the resins are tabulated in Table 1.

TABLE 1

| First temperature | Sealing film #1: 45 to 180° C. MB1515 and AF325 Sealing film #2: 115 to 155° C. One of FM123-2, FM123-5, AF126 and AF126-2, and AF325 | | | |
|---|---|---|---|---|
| Second temperature | 160 ± 5° C. | 55 ± 5° C. | 55 ± 5° C. | 60 ± 10° C. |
| Third temperature | 180 ± 5° C. | 80 to 110 ° C. | 120 ± 5° C. | 180 ± 5° C. |
| RTM resin | Epoxy resin A | Epoxy resin B | Epoxy resin C | Polycyanate resin D |

Note:
A: PR-500 (Minnesota Mining and Manufacturing Co.)
B: TR-A31 (Toray Industries Inc.)
C: YER-017, YER-058 (The Yokohama Rubber Co., Ltd.)
D: NM20 (Nippon Oil Corp.)

It goes without saying that the laminated sealing films and the impregnating resins may be other than those shown in Table 1.

As apparent from the foregoing description, according to the present invention, the cells of the honeycomb core are sealed by the laminated sealing films each consisting of two films respectively formed of different resins respectively having different flowling profile to prevent the excessive permeation of the resin forming the laminated sealing films into the dry fabrics and to enhance the adhesion of the resin of the laminated sealing films to the honeycomb core by forming proper fillets of the resin of the laminated sealing films, drying of the dry fabrics enables the application of the RTM process to the formation of the honeycomb sandwich composite panel. Thus, the honeycomb sandwich composite panel having a satisfactory quality can be fabricated at a low cost.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

This application is based on the Japanese Patent Application No. 236673/2001 filed on Aug. 3, 2001, the content of which is herein incorporated by reference.

What is claimed is:

1. A method for forming a honeycomb sandwich composite panel comprising:

stacking dry fabric, an unpermeating-resin film in contiguity with the dry fabric, a honeycomb core, and a non-low viscosity resin film in contiguity with the honeycomb core and positioned between the honeycomb core and unpermeating-resin film in the honeycomb sandwich composite panel to form a stacked structure on a lower half mold of a mold;

putting an upper half mold of the mold on the stacked structure and clamping together the upper half mold and the lower half mold;

heating an interior of the mold at a first temperature for a predetermined heating time to cure the unpermeating-resin film and the non-low-viscosity-resin film and to dry the dry fabric;

changing a temperature of the interior of the mold to a second temperature while the interior of the mold is evacuated; and then supplying an impregnating resin into the mold to impregnate the dry fabric with the impregnating resin; and heating the interior of the mold at a third temperature for a predetermined heating time to cure the impregnating resin supplied into the mold, wherein the unpermeating-resin film contiguous with the dry fabric has a flowing profile different from a profile of the non-low-viscosity-resin film contiguous with the honeycomb core, and the flowing profile of the unpermeating-resin film is a property for preventing the resin forming the unpermeating-resin film from permeating into the dry fabric at the first temperature to cure the unpermeating-resin film and the non-low-viscosity-resin film and to dry the dry fabric.

2. The method for forming a honeycomb sandwich composite panel according to claim 1, wherein the impregnating resin is one of a thermosetting epoxy resin and a thermosetting polycyanate resin, said unpermeating-resin film contains a thermosetting epoxy resin, and said non-low-viscosity-resin film is formed of a thermosetting epoxy resin.

3. The method for forming a honeycomb sandwich composite panel according to claim 1, wherein the flowing profile of the non-low-viscosity-resin film is a property for flowing along a wall defining of said honeycomb core to form fillets.

4. The method for forming a honeycomb sandwich composite panel according to claim 1, further comprising:

sealing the mold to provide for no pressure difference between an interior of the honeycomb core and space for accommodating the dry fabric before starting the heating the interior of the mold at the first temperature.

5. The method for forming a honeycomb sandwich composite panel according to claim 1, wherein
evacuating the interior of the mold starts after the interior of the mold is heated up to the first temperature.

6. The method for forming a honeycomb sandwich composite panel according to claim 1, wherein evacuating the interior of the mold is done with an air discharge port; and
wherein evacuating the interior of the mold ends after the impregnating resin starts to overflow through the air discharge port.

7. The method for forming a honeycomb sandwich composite panel according to claim 1, wherein supplying the impregnating resin into the mold is done with a resin supply line; and the method further comprising;
inspecting the supply line for leakage after the unpermeating-resin film and the non-low-viscosity-resin film have been cured.

8. The method for forming a honeycomb sandwich composite panel according to claim 1, wherein supplying the impregnating resin into the mold is done via a resin supply port, and wherein the resin supply port is closed before heating the interior of the mold at the first temperature.

9. A method for forming a honeycomb sandwich composite panel according to claim 1, wherein evacuating the interior of the mold is done via an air discharge port, and wherein the air discharge port is closed before heating the interior of the mold at the first temperature.

* * * * *